Patented Mar. 22, 1932

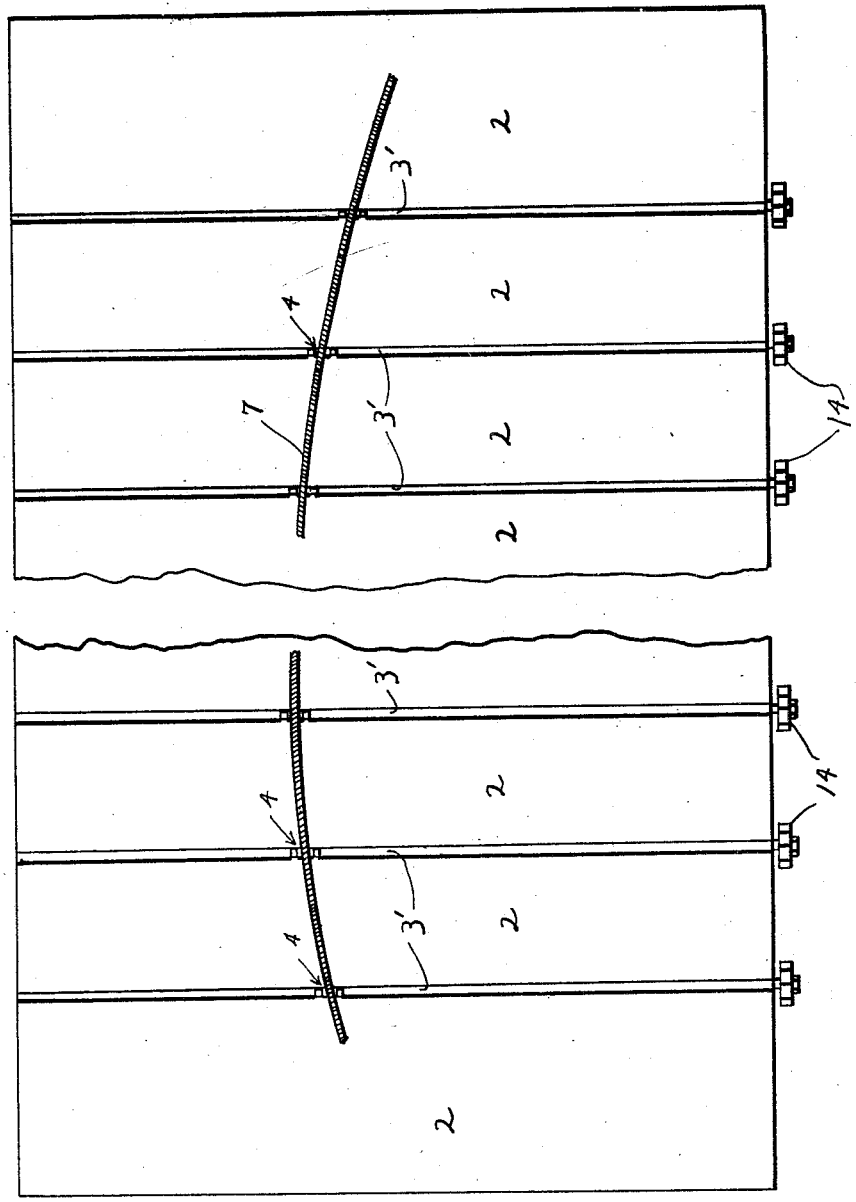

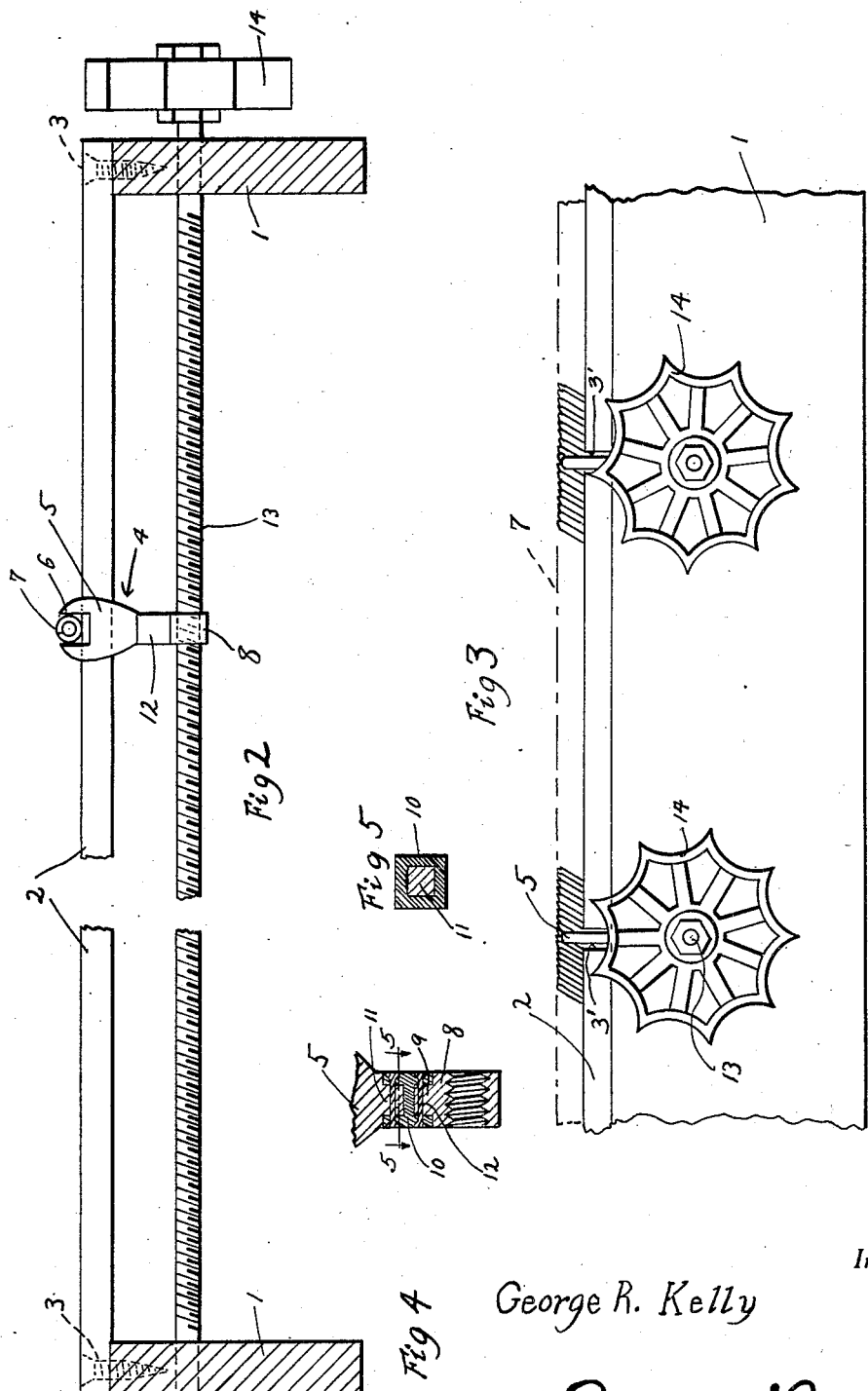

1,850,632

UNITED STATES PATENT OFFICE

GEORGE R. KELLY, OF HIGHLAND PARK, MICHIGAN

DEVICE FOR USE IN CUTTING GLASS

Application filed September 29, 1930. Serial No. 485,250.

The present invention relates to certain new and useful improvements in glass cutting devices and has more particular reference to a device for use in cutting non-shatterable glass.

A primary object of the present invention is to provide a device to facilitate the cutting of the glass on any desired arc.

In accordance with the present invention, means is provided for securing a heating coil in operative position with respect to the glass to be severed, with the coil arranged in a desired arc for heating the glass on an arc conforming to the arc of the heating coil. As is well known in the art, in severing glass, a heating coil or resistance wire is used and may be placed either in contact with the glass or in slightly spaced relation relative thereto so that the glass will become heated sufficiently to permit of the cracking off operation, which operation is accomplished in a manner well known in the art.

The particular invention is however, particularly concerned with the cutting of windshield glass. The glass now generally used for windshields is, due to the peculiar construction of windshield frames now in use, provided with one arcuate edge, and to this end adjustable means is provided for retaining the heating coil or resistance wire in operative position to the glass and at a desired arc to facilitate the attainment of an arcuate edge for the windshield glass.

A still further object of the invention is to provide a device of this nature which will facilitate the cutting of non-shatterable glass.

The above objects are obtained through the novel combination, construction and arrangement of parts shown in the accompanying drawings and herein described and claimed.

In the drawings:

Figure 1 is a top plan view of the device,

Figure 2 is a transverse sectional view therethrough,

Figure 3 is a fragmentary side elevational view thereof,

Figure 4 is a fragmentary detail view illustrating certain details of construction herein more fully referred to, Figure 5 is a detail sectional view taken substantially on the line 5—5 of Figure 4.

With reference more in detail to the drawings, it will be seen that my improved device comprises a table that includes a pair of spaced parallel vertical supporting members 1 that support therebetween a top, the latter including a plurality of longitudinally spaced boards or bars 2 that are suitably secured at their ends to the upper edges of the members 1 as at 3.

The boards 2 form the top of the support or table and are preferably formed of asbestos board while the supporting members 1 may be wood or any other suitable material.

The spaces between the adjacent boards 2 provide transverse guide slots 3'. In each slot 3' is operable a heating coil guide member 4. Each of the guide members 4 include a head portion 5 that is bifurcated at its upper end 6 and adapted to receive in the furcation a portion of an electric heating coil or wire 7. Connected to the lower end of the head 5 of the guide, is an internally threaded sleeve 8 provided with a radial projection 9 adapted to fit in the lower socket end of a coupling 10 that is formed of suitable insulating material. The coupling 10 at its upper end is also provided with a socket in longitudinal alinement with the socket in the lower end thereof and is adapted to receive in said upper socket the projection 11 of the head 5.

The projections 9 and 11 are retained in their respective sockets of the insulated connecting sleeve 10 through the medium of suitable insulated retaining elements 12.

For each coil guide 4 and disposed beneath the table top parallel to the slot of the particular guide 4 is an adjusting screw 13 that has its ends suitably journaled in the supports 1 of the table.

On one end thereof each of the adjusting screws 13 is provided with a suitable actuating handle 14.

The sleeve 8 threadedly engages the adjusting screw 13, so that obviously upon rotation of the screw 13, the guide 4 will be moved longitudinally of its guide slot 3'.

In actual practice, there may be any desired number of guides 4 and to arrange the heating coil 7 at any desired arc on the table, the guides 4 by proper manipulation of the screws 13 are so positioned relative to one another as to define an arc, and the coil 7 being of course resilient will assume the position or arc so defined by the proper relative positioning of the guides 4.

The electric current may be supplied to the coil through any suitable well known means, so that the coil is brought to a high degree of heat, and the glass within a short period of time will be heated sufficiently to permit of the cracking off operation. It will thus be seen that the glass may be severed on an arcuate line as defined by the heating coil.

It is thought that from the foregoing description taken in connection with the accompanying drawings a clear understanding of the operation, construction, utility and advantages and purpose of an invention of this character will be had, and further, that the invention is susceptible to improvements and modifications coming within the scope of the appended claims.

Having thus described my invention, what I wish to claim as new is:

1. In a device of the class described, a relatively flat support having a plurality of longitudinally spaced guide slots formed therein, a plurality of rotatably mounted adjusting screws mounted beneath the support, one for each of said slots, an electrical heating coil for disposition above said support, guides supporting said coil and operable in said slots, each of said guides including a threaded sleeve engaging one of said adjusting screws.

2. A device for use in cutting glass, comprising a support for the glass, a heating coil for disposition between the glass to be cut and the support, guide members engaging said coil and operable transversely of said support, and means for positioning said guide members relative to one another whereby said coil may be adjusted to assume a predetermined arc.

3. A device for use in cutting glass comprising a pair of spaced apart supporting members, a glass supporting member including a plurality of longitudinally spaced boards connecting said first mentioned supports, a plurality of longitudinally spaced adjusting screws extending between said first mentioned supports, guide members threadedly engaged with said adjusting screws, each of said guide members comprising a bifurcated head operable in the space between adjacent boards, and a heating coil arranged in the furcation of said head for movement with said head relative to said boards, said guide members adapted to be adjusted relative to one another whereby said coil may be adjusted to define an arc of a predetermined radius.

4. A device for use in cutting glass comprising a pair of spaced apart supporting members, a glass supporting member including a plurality of relatively spaced elements connecting said first mentioned supports, a plurality of longitudinally spaced adjusting screws extending between said first mentioned supports, guide members threadedly engaged with said adjusting screws, a heating coil connecting said guide members, and each of said screws provided with means for rotating it, whereby said guide members may be adjusted relative to one another.

In testimony whereof I affix my signature.

GEORGE R. KELLY.